Aug. 13, 1968 W. F. KNAPP 3,396,999
SAFETY LOCK FOR AUTOMOTIVE VEHICLES
Filed March 15, 1966 3 Sheets-Sheet 1
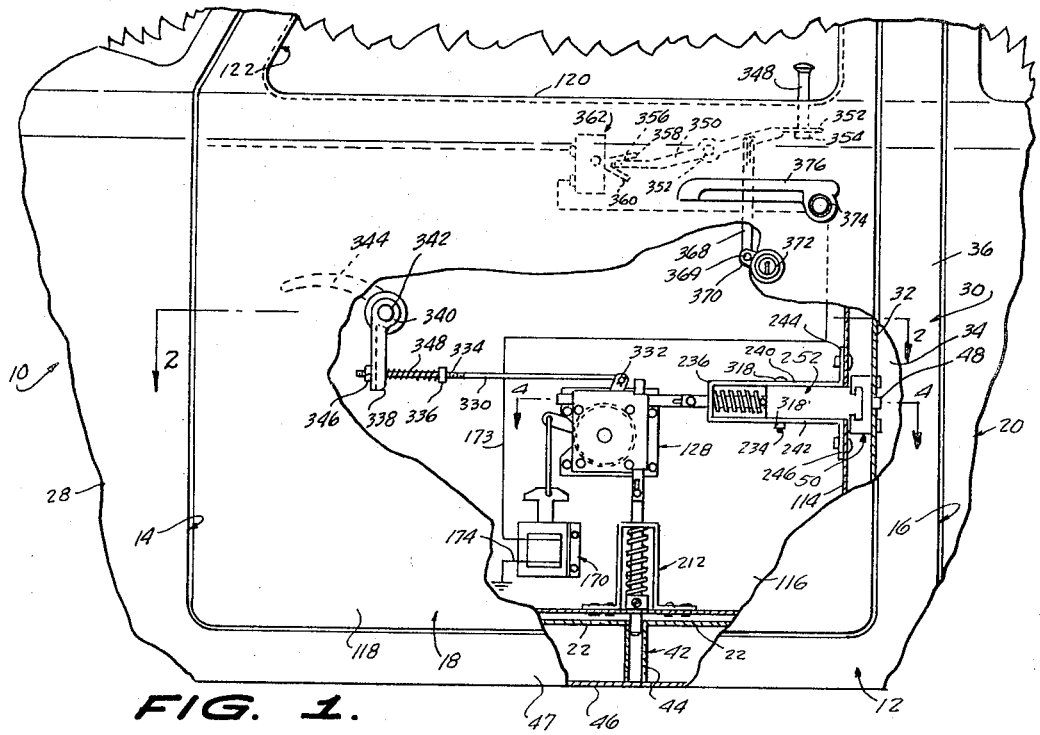
FIG. 1.
FIG. 2.
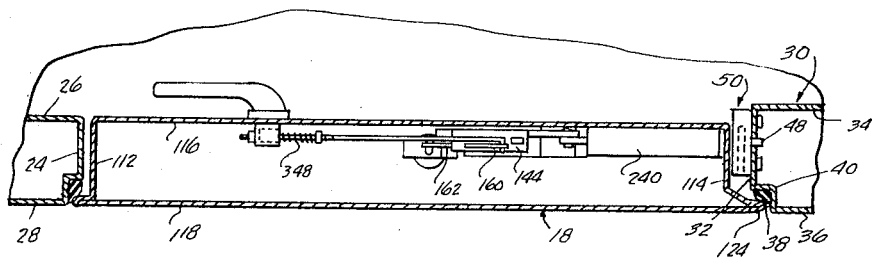
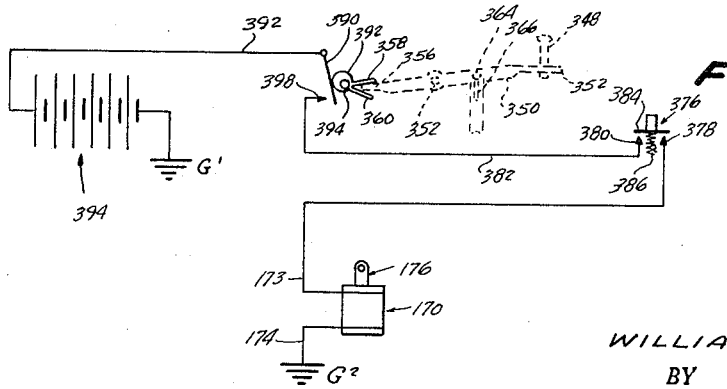
FIG. 3.
INVENTOR.
WILLIAM F. KNAPP,
BY
Berman, Davidson & Berman
ATTORNEYS.

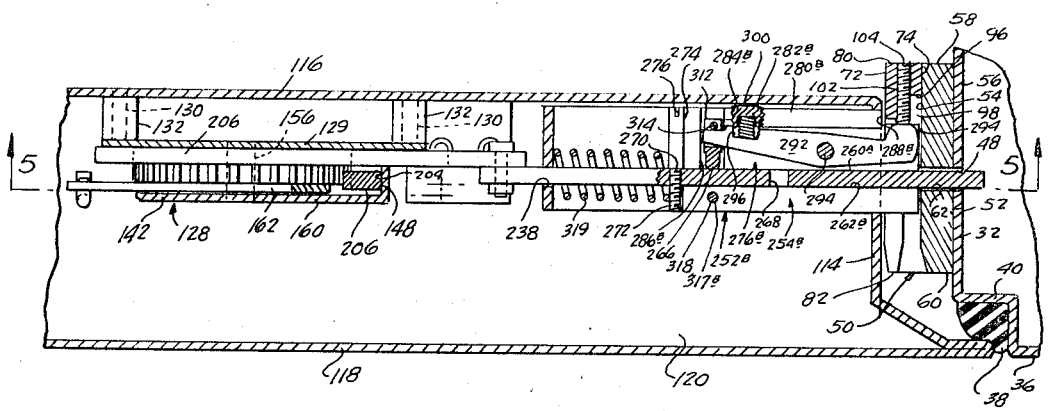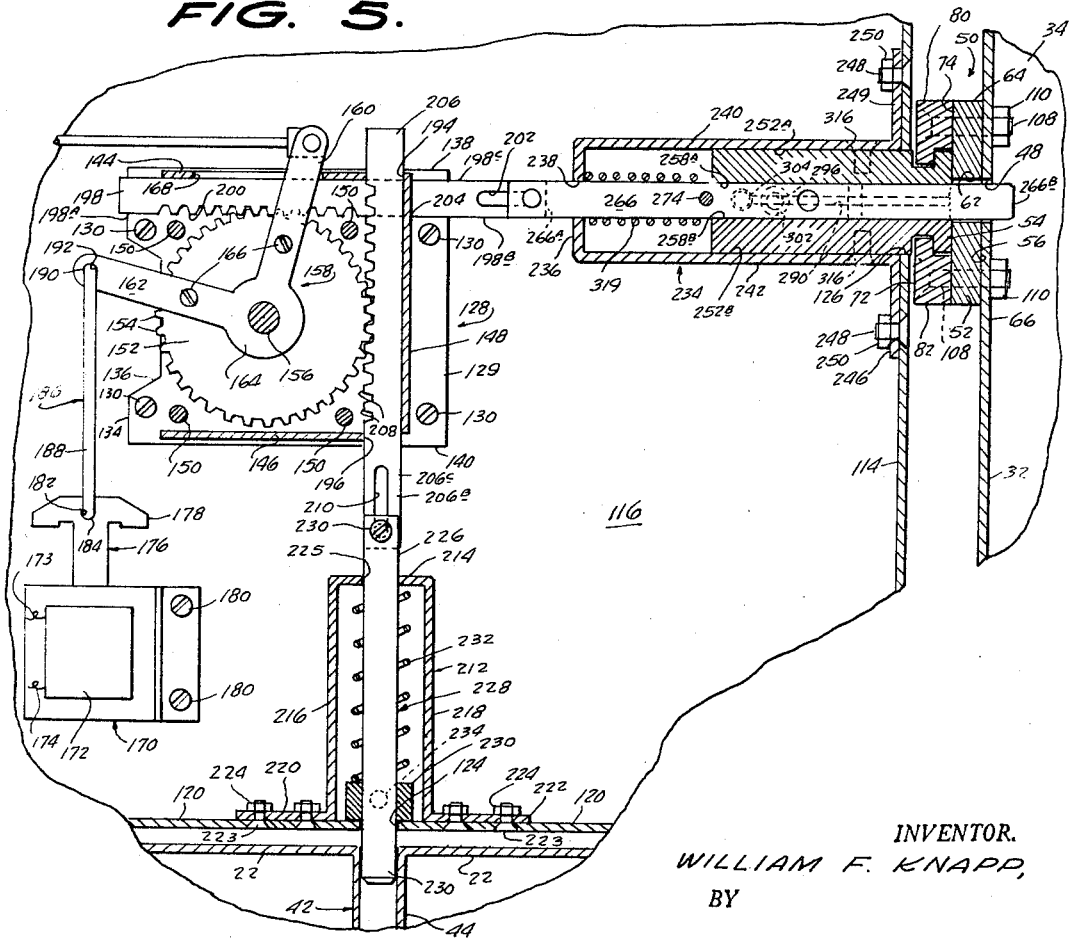

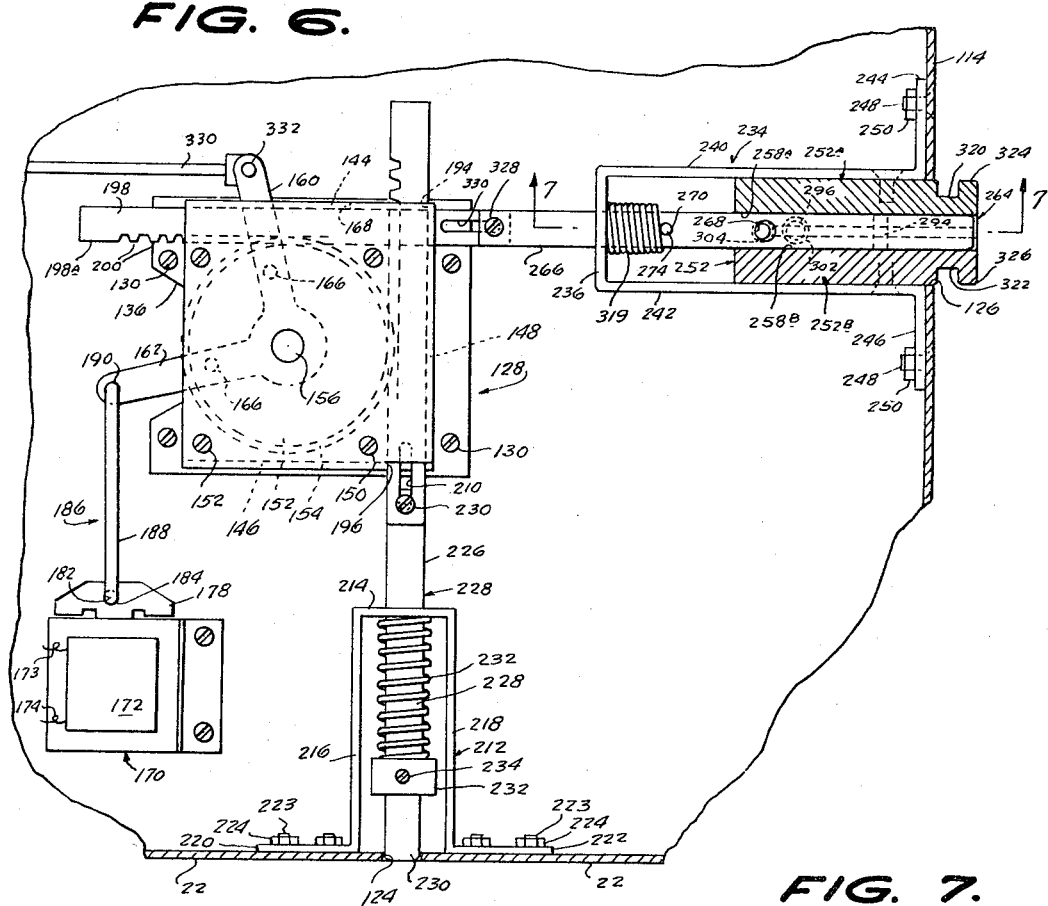
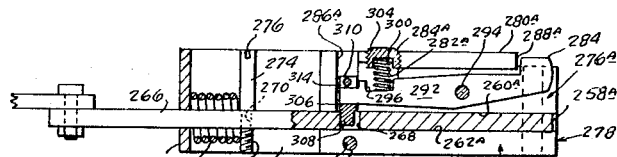
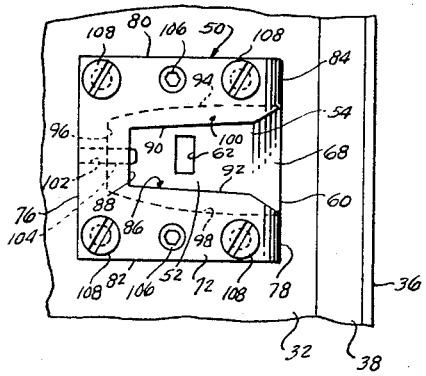

United States Patent Office 3,396,999
Patented Aug. 13, 1968

3,396,999
SAFETY LOCK FOR AUTOMOTIVE VEHICLES
William F. Knapp, 2358 Barksdale Blvd.,
Bossier City, La. 71010
Filed Mar. 15, 1966, Ser. No. 534,367
3 Claims. (Cl. 292—39)

ABSTRACT OF THE DISCLOSURE

A lock for motor vehicle doors comprising a side bolt and a bottom bolt; a rack connected to each bolt by a lost motion connection; each bolt having resilient means biasing it toward locking position; a gear meshing with both racks; a manually operable handle remotely connected to said gear, for rotating said gear to withdraw said bolts from locking position; solenoid means connected to said gear for rotating said gear to withdraw said bolts, a manually operable switch remote from said handle for energizing said solenoid and lost motion means in the remote connection of said handle whereby said handle and said switch may be operated independently of each other.

---

This invention relates to the general field of locking mechanisms and, more specifically, the instant invention pertains to the provision of lock means for the doors of automotive vehicles and the like, but it will be recognized that the application of the teachings of the instant invention may be extended to find utilization in other fields wherein it is desired to releasably-secure a closure member for an opening in its closed position.

It is a well-known and established fact that the public at large and specific agencies of the Federal and State governments are becoming increasingly alarmed at the holocaust caused by and through the operation of automotive vehicles on this Nation's highways and roads. While the number of persons killed and injured year-after-year continues to mount, and as automotive vehicles of the conventional type bought by the public are constantly improved to increase their power and speeds, the manufacturers of such vehicles have failed to provide the purchasing public with improved safety devices to protect the passengers of such vehicles from death and injury. This is not to state that the manufacturers have ignored the public's demand for safety features for steps in this direction have been taken, for example, in the provision of safety belts and other types of harness, and in the making of such equipment standard instead of optional as has been the case over many years. While such harness and related equipment comprises a marked step forward in insuring vehicle passengers against injury or death, the means are only apathetically received by the public and are, for the most part, psychologically rejected by individuals who resent the wearing of constricting devices. But regardless of the use of non-use of such harness means, reference to any current newspaper or periodical will reveal that death and/or personal injury to a person or persons riding in an automobile or similar vehicle involved in a collision more commonly results as the direct consequence of the inadvertent and accidental opening of the doors of the vehicle to permit the driver and such passengers as the vehicle may carry to be thrown therefrom to fall upon the road to their injury or possible death and, in some cases, to be crushed by the automobile as the same rolls. Such injuries generally occur when the doors of the vehicle are sprung from their normally closed positions to their respective open positions, thereby permitting the occupants of the car to be thrown through the ingress and egress passageway.

In such cases, the doors of the vehicle are sprung to their open positions since ordinarily no means is provided to hold the doors in their closed positions once the lock bars of the vehicle as provided by the manufacturer have escaped their respective keepers. More particularly, the escape of the lock bars results from damage to the vehicle at the door jamb section thereof whereby the keepers for the lock bars are sprung away from their normal locking position. This frees the cooperating end of the lock bar, permitting the door to swing open under the force of vehicle impact.

While many attempts have been made in prior art devices to overcome this hazardous condition, such locking means are generally ineffective to serve their intended purpose and this potentially dangerous situation continues to exist.

It is, therefore, one of the primary objects of this invention to provide safety locking means for automobile or other vehicle doors which may comprise the manufacturers' component therefor or be added as an attachment to existing doors, with but slight alteration to their structure.

A further object of this invention is to provide safety locking means for automotive vehicles, the locking means being of a vault type.

A still further object of this invention is to provide vault-type safety locking means effective to lock a vehicle door against inadvertent or accidental opening and wherein the locking means is made operable on at least two different and spaced structural members of an automotive vehicle, the door jamb member and splash plate, for example.

Another object of this invention is to provide safety locking means for vehicle doors together with electrical control means including a main switch under the direct control of the vehicle operator together with individual passenger-operated switches for effecting and rendering the locking means inoperable. The latter being over-ridden at all times by the aforementioned main control switch.

A further object of this invention is to provide a safety locking mechanism for doors of vehicles wherein the operating means for the lock bolts and bars are formed of rigid and wear-resistant plastic materials.

This invention contemplates, as a still further object thereof, the provision of a safety locking mechanism for the doors of an automotive vehicle, the mechanism being non-complex in construction assembly, inexpensive to manufacture, and which is durable in use.

Other and further objects and advantages of the instant invention will become more evident from a consideration of the following specification when read in conjunction with the annexed drawings, in which:

FIGURE 1 is a fragmentary side elevational view of the body of a conventional automobile including a showing of the door normally adjacent the driver's seat, the figure being partly broken away to illustrate the component working elements of this invention;

FIGURE 2 is a fragmentary detail cross-sectional view, FIGURE 2 being taken substantially on the horizontal plane of line 2—2 of FIGURE 1, looking in the direction of the arrow;

FIGURE 3 is a schematic wiring diagram illustrating the electrical control for the safety lock;

FIGURE 4 is an enlarged fragmentary detail cross-sectional view, FIGURE 4 being taken substantially on the horizontal plane of line 4—4 of FIGURE 1, looking in the direction of the arrows;

FIGURE 5 is an enlarged fragmentary detail cross-sectional view, FIGURE 5 being taken substantially on the horizontal plane of line 5—5 of FIGURE 4, looking in the direction of the arrows;

FIGURE 6 is an enlarged fragmentary side elevational view, partly in cross-section, and similar to FIGURE 1, FIGURE 6 showing the lock bar and lock bolt as being moved to their inoperative positions;

FIGURE 7 is an enlarged fragmentary detail cross-sectional view, FIGURE 7 being taken substantially on the horizontal plane of line 7—7 of FIGURE 6, looking in the direction of the arrows;

FIGURE 8 is a fragmentary end elevational view of a door jamb together with keeper means constructed in accordance with this invention; and FIGURE 9 is a fragmentary side elevational view of the free end of an automobile door and showing in end elevation a lock bar according to this invention.

Referring now more specifically to the drawings, reference numeral 10 designates, in general, a conventional automobile or other vehicle having doors. The vehicle 10 in the embodiment thereof herein represented in the drawings includes a conventional chassis-supported body 12 having ingress and egress openings 14 and 16 formed therein adjacent the front and rear seats thereof, respectively, there being a pair of similar openings (not shown) at the opposite side of the vehicle. A closure member or door 18, 20 is provided for each opening 14, 16, respectively, and each closure member is of conventional vehicle door construction.

In describing the invention infra, the details of its construction and operation are herein limited in its application to but a single vehicle door, namely, the left-hand door as illustrated therein, or that door which is normally located immediately adjacent the driver's seat. However, the extension of this invention to the other doors of the vehicle will be readily understood by those skilled in this art.

To continue, the door opening 14 is defined at its lower end by a conventional splash guard 22 forming a part of the chassis, and at the hinge side thereof by a conventional upright side frame member 24 (see FIGURE 2) comprising a normally integral part of the body 12 and connecting the inner and outer sidewalls 26, 28 thereof, respectively, all in the conventional manner. The opposite side of the door opening is defined by the usual upright door jamb post 30 (see FIGURES 1 and 2) and includes a normally upright door jamb side frame member 32 disposed in confronting relation relative to the side frame member 24 and which serves as a bight connecting the inner and outer walls 34, 36 of the post 30. The jamb sidewall 32 and the outer wall 36 are joined to form an outwardly-opening conventional right-angled groove 38 in which is disposed a quarter-round resilient sealing member 40, see FIGURES 2 and 4, all in the usual manner.

The splash guard 22 is interrupted intermediate its ends by an upright elongated substantially hollow cylindrical lock bar keeper plug (see FIGURES 1 and 5) which is, preferably, integrally-formed therewith or rigidly-connected thereon to depend therefrom at substantially right angles relative thereto. As is seen in the drawings, the keeper plug 42 includes an elongated substantially hollow cylindrical sidewall 44 having an end opening into the plane of the upper side of the splash guard 22, and the other open end thereof extends downwardly toward the elongated extension 46, of the conventional rocker plate 47, that extends parallel to the splash guard 22 in vertically-spaced relation relative thereto.

The jamb sidewall 32, intermediate its upper and lower ends, is formed with a transversely-extending substantially rectangular lock bar keeper opening 48 (see FIGURES 2, 4 and 5), and a lock bar keeper, per se, is fixedly-secured to the jamb sidewall 32 contiguous to the opening 48 and is herein assigned the general reference numeral 50, the details of the keeper being illustrated in detail in FIGURES 1, 2, 4, 5 and 8.

The lock bar keeper 50 comprises a substantially solid rectangular main body portion 52 having a pair of opposed front and back faces 54, 56, respectively, and a pair of opposed inner and outer sides 58, 60, respectively, the inner side 58 facing the interior of the vehicle 10, and the outer side 60 being proximate the quarter-round 40. The main body portion 52 is provided with a substantially centrally located transversely-extending rectangular opening 62 having substantially the same dimensions as the opening 48. The main body portion 52, intermediate its upper and lower ends 64, 66, respectively, is formed with a ramp 68 (FIGURE 8) which inclines inwardly from its front face 54 toward the back face 56 and which extends to and intersects the side 60.

The lock bar keeper 50 also includes a substantially rectangular front face plate 70 having substantially the same dimensions as the main body portion 52 and includes front and back surfaces 72, 74. For future reference, the front face plate is further defined by oppositely-disposed inner and outer sides 76, 78, respectively, and upper and lower ends 80, 82, respectively, see FIGURE 8. To facilitate car-door operation, the front face plate 70 adjacent its outer side 60 is rounded off as at 84.

To serve a function to be described, the front face plate 70 is formed, intermediate its upper and lower ends 80, 82, respectively, with a horizontally-elongated substantially C-shaped slot 86 (see FIGURE 8) having a closed bight end 88 adjacent to, but spaced inwardly from the side 76, and upper and lower confronting, vertically-spaced and parallel sides 90, 92, respectively. The open side of the slot 86 is coplanar with the side 78 of the front face plate 70. The front face plate 70, adjacent the peripheral marginal edges of the slot 86, is provided with connecting undercut grooves 94, 96 and 98 giving rise to a continuous shoulder 100. The roots of the connected grooves preferably trace the truncated ogive profile clearly shown in dotted lines in FIGURE 8.

As is illustrated in FIGURE 4 of the drawings, an elongated tapped opening 102 extends inwardly from the inner side 80 to open into the groove 96 intermediate its upper and lower ends (see FIGURE 8) and receives therein an Allen-type adjustment screw 104, the inner end of the latter normally being positioned adjacent the bight end 88.

The front face plate 70 is superposed against the main body portion 52 with the front face 54 thereof being coplanar with the back surface 74 and with their respective inner and outer sides and top and bottom ends being disposed in coplanar relationship. The main body portion 52 and the front face plate are then assembled by a pair of countersunk Allen screws 106 to form a unit comprising the lock bar keeper 50; the latter, as is seen in the drawings, is mounted on the jamb sidewall 32 by transversely-extending corner bolts 108 and nuts 110, the back face 56 being made substantially coplanar with the adjacent side of the jamb sidewall 32, and with the openings 48 and 62 being aligned with one another.

Each of the ingress and egress openings 14, 16 are adapted to be closed by the closure members or doors 18, 20 referred to supra, and are of conventional design and construction: and confining the salient features of this invention under the conditions outlined supra, the door 18 is seen to comprise a pair of laterally-spaced upright sidewalls 112, 114 which serve as spacer-connectors extending perpendicularly between and connected on the inner and outer upright and spaced door panels 116, 118. The sidewalls 112, 114 and door panels 116, 118 have their respective lower ends fixedly-connected to a horizontal bottom frame member 120 which, when the door 18 is in its normally closed position, extends parallel to and in confronting vertically-spaced relation relative to the splash guard 22 (see FIGURE 5). The upper ends of the inner and outer panels 116, 118 are connected by a normally horizontal sill or bottom wall 120 defining the lower end of the conventional window opening 122, all in the usual manner. As is seen in FIGURE 2, the sidewall 114 and the adjacent side of the panel 118 are joined to form a sealing flange 124 adapted to make sealing engagement with the quarter-round 38 in the usual manner when the door 18 is in its closed position, it being understood that the side frame member 112 is disposed at the hinge side of the door 18 (the hinge connection not being shown as it is old in the art), and it further being understood that the door 18 is swingable downwardly, reference being made to FIGURES 2 and 4, to its open position and reversely to its closed shown position in these figures. It should also be here noted that the construction of the door 18 is such as to provide suitable spacing between the jamb sidewall 32 and the normally adjacent door sidewall 114 so as to accommodate the keeper 50 therebetween while still permitting the door 18 to swing to its open and closed positions. Further, and to serve functions to be described, the bottom wall 120 is provided with a transversely-extending cylindrical opening 124 (see FIGURES 5 and 6) intermediate its opposed ends and which, when the door 18 is in its closed position, is aligned with the keeper plug 42, and the sidewall 114 is formed, intermediate its respective ends, with a substantially rectangular opening 126 enlarged with respect to the opening 42 and disposed in laterally-spaced concentric relationship relative thereto when the door 18 is in its closed position.

Reference numeral 128 (FIGURES 1, 4, 5 and 6) denotes a substantially hollow rectangular gear box or housing mounted on the door 18 between the inner and outer panels 116, 118. The gear box 128 comprises a mounting plate 129 having a substantially rectangular configuration, the mounting plate 129 being suitably apertured along its marginal edges and adjacent the four corners thereof receive mounting screws 130 therethrough for connection with the inner panel 116, the screws 130 each passing through an associated spacer collar 132 (see FIGURE 4) to hold the mounting plate 129 in laterally-spaced relation relative thereto, all in the conventional manner. As is seen in FIGURE 5, the mounting plate 129 is horizontally-elongated and that end 134 thereof proximate the sidewall 112 is provided with an inwardly-extending normally upright cut-out 136 between its upper and lower edges 138, 140, respectively. The outer side of the gear box 128 is closed by a face plate 142 having a substantially rectangular configuration and provided, adjacent the marginal edges at the top and bottom thereof and at the marginal edge thereof at that end adjacent the sidewall 114 with laterally-projecting integrally-formed and connected top, bottom and end flanges 144, 146 and 148, respectively. The face plate 142, by means of the screws 150, extending transversely therethrough adjacent the corners thereof, is connected to the mounting plate 129 with the outer ends of the flanges 144, 146, 148 engaging thereagainst to hold the face plate 142 laterally-spaced therefrom. It should be here noted that the horizontal dimensions of the face plate 142, reference being had to FIGURE 5, are such that the screws 130 are free and clear for installation purposes.

Disposed in the gear box 128 between the mounting plate 129 and the face plate 142 is a spur gear 152 having gear teeth 154 thereon, the spur gear 152 being supported for rotation on a cylindrical shaft 156 the opposed ends of which extend between and are supported on the mounting and face plates 129, 142, respectively, substantially centrally thereof. At 158 is indicated a V-shaped lever imposed against the outer side of the spur gear 152 and having opposed elongated arms 160, 162 diverging from a substantially cylindrical hub 164 also mounted on the shaft 156. Screws 166 extend transversely through the arms 160, 162 and are threaded in suitable tapped openings (not shown) formed in the spur gear 152 to releasably-secure the lever 158 thereto. As is clearly shown in FIGURE 5, the arms 160, 162 extend radially away from the shaft 156, and the free end of the arm 160 is of such length as to span across and extend beyond the adjacent gear teeth 154 and through and beyond an elongated substantially rectangular slot 168 formed in the upper flange 144 adjacent the open end of the face plate 142. The free end of the other arm 162 is of such length as to span across and extend beyond adjacent gear teeth 154, the arm 162 preferably extending transversely across the cut-out 136, beyond the adjacent end of the mounting plate 129, and through the open side of the face plate 142.

An electromagnet is indicated at 170 (see FIGURES 1, 5 and 6) and includes a winding 172 having leads 173, 174 and a reciprocable T-shaped armature 176 having a crosshead 178. Screws 180 and appropriate fittings therefor serve to connect and support the electromagnet 170 on and in spaced relation relative to the inner panel 116. The crosshead 178 is transversely-apertured as at 182 intermediate its ends, and the aperture 182 pivotally-receives therein one arm 184 of a substantially C-shaped link 186, the arm 184 projecting laterally from one end of its bight portion 188 and the other end of the bight portion 188 terminating in a laterally-projecting arm 190 which is pivotally-received within an aperture 192 extending transversely through the arm 162 adjacent its outer free end.

The top flange 144 adjacent the end flange 148 is formed with a transversely-extending substantially rectangular guide slot 194 and a similar substantially vertical slot 196 is formed in the bottom flange 146 in vertically-spaced alignment therewith. Extending for reciprocation through the guide slot 194 is an elongated substantially rectangular lever 198 having gear rack teeth 200 cut in its underside adjacent one end 198A thereof. The underside 198B of the other or inner end of the lever 198 is smooth as at 198B, and the other or inner end of the lever 198 is formed with an axially-elongated normally horizontal transversely-extending slot 202 to serve a function to be described. As is clearly seen in the drawings, the other or inner end of the lever 198 is slidably-mounted through a third substantially rectangular guide slot 204 at the upper end of the flange 148 adjacent the flange 144, the lever 198 being freely reciprocable through its associated slot 204.

In the shown assembly of the gear box 128, the rack gear teeth 200 are meshed with the gear teeth 154 at the upper end thereof with the upper side 198C of the lever 198 slidably-engaging the underside of the flange 144 in such a manner that the flange 144 serves as a hold-down means for the lever 198 as the latter is operated throughout its reciprocable cycle in a manner to be described infra.

Reference numeral 206 denotes an elongated substantially rectangular lever also having an end normally disposed within the gear box 128. The lever 206 is provided, as in the case of the lever 198, with a plurality of transversely-extending gear rack teeth 208 in a side 206A adjacent an end thereof. The side 206A adjacent its other or inner end 206B is smooth and works reciprocably through the slot 194, that portion of the inner end 206B that projects beyond and exteriorly of the flange 146, is provided with an axially-elongated normally vertical transversely-extending slot 210 serving a function to be described.

As is shown in the several figures of the drawings, the opposed ends of the lever 206 reciprocate, respectively, through the guide slots 194, 196, and as is seen in FIGURE 4, the lever 208 is disposed adjacent the face plate 142 while the lever 198 is remotely-positioned relative thereto. The levers 198 and 206 are disposed at right angles relative to one another (see FIGURE 5), and the rack teeth 208 of the lever 206 mesh with the teeth 154 of the gear 152 at a side of the latter while the other side 206 C of the lever 206 slidably-engages the inner side of the flange 148 as the lever 206 is reciprocated, the flange 148 acting in this instance as hold-down means to maintain the meshed relationship between the gear teeth 154, 208 as the lever 206 is reciprocated.

An inverted substantially U-shaped bracket is indicated at 212 (see FIGURES 1, 5 and 6), the bracket 212 comprising a normally horizontal bight portion 214 from the opposed ends of which downwardly-depend, respectively, the arms 216, 218. The lower ends of the arms 216, 218 terminate in opposed diverging connector flanges 220, 222 secured to the splash guard 120 by bolts 223 and nuts 224 in such a manner that a cylindrical opening 25 formed in the bight portion 214 is disposed in vertically-spaced and coaxial alignment with the keeper plug 42.

One end 266 of the vertically-reciprocable elongated cylindrical lock bolt 228 is mounted for reciprocation through the opening 225, the end 226 being flattened for juxtaposition against and in flush engagement with a similar flattened portion of the end 206B of the lever 206 to which it is connected by means of the transversely-extending pin 230, the latter being carried by the bolt 228 and slidably works in the slot 210, the connection being that of a lost-motion type between adjacent ends of the lever 206 and the bolt 228. The other end 230 of the lock bolt 228 is extended through the cylindrical opening 124 formed in the splash guard 120 and from which it is never normally disengaged, the other end 230 of the bolt 228 making telescopic engagement within the keeper plug 44. From an examination of the drawings it should be self-evident that the lock bolt 228 may be alternately extendible in and retractable from its keeper plug 44 during the normal course of operation of the lever 206 in order to serve functions to be described.

As is seen in FIGURES 5 and 6, a substantially cylindrical stop collar 232 is mounted on the end 230 of the lock bolt 228 and is held thereon in adjusted position relative thereto by means of a radially-extending set screw 234. The collar 230 has an end thereof normally confronting and engaging the circumferential marginal edge of the splash guard 120 surrounding the opening of the keeper plug 42 therein and serves to limit the degree of extension of the lock bolt end 230 into the keeper plug 42.

The lock bolt 228 reciprocates, of course, between the arms 216, 218 and is surrounded by a helicoidal spring 232 having an end abutting against the opposed end of the collar 230, the other end of the spring 232 being disposed in engagement with the adjacent side of the bight portion 214. The arrangement is such that the lock bolt 228 is constantly biased for movement in a direction toward the keeper plug 42.

A second substantially U-shaped bracket 234 includes a normally upright bight portion 236 provided with a substantially rectangular transversely-extending opening 238, and from the opposed ends of the bight portion 236 laterally and horizontally-extend a pair of vertically-spaced arms 240, 242 that terminate in diverging flanges 244, 246 secured to the door side wall 114 by bolts 248 and nuts 250. As is seen in FIGURES 5 and 6, the bight portion 236 spans the opening 126 with the openings being disposed in confronting non-concentric relation relative to one another.

Between the arms 216, 218 adjacent the flanges 244, 246 is disposed an elongated substantially rectangular compound block 252, see FIGURES 1, 6 and 9, formed of two right and left-hand identically constructed elongated and rectangular members 252A, 252B each comprising one-half of the compound block 252.

In assembly, the rectangular members 252A, 252B have adjacent coplanar faces 254A, 254B (see FIGURES 4 and 7) into each of which is cut or formed, from end-to-end, an inwardly and longitudinally-extending U-shaped groove 256A, 256B, respectively, adjacent a marginal edge of each one thereof. Each groove 256A, 256B is demarked by bight portions 258A, 258B disposed in confronting relation relative to one another (see FIGURES 5, 6 and 9) and opposed pairs of longitudinally-extending laterally-spaced and parallel sidewalls 260A, 262A, and 260B, 262B, respectively, the pairs of sidewalls 260A, 260B and 262A, 262B being coplanar and comprising extensions of each other, and when taken together with the bight portions 258A, 258B form an elongated open-ended slideway 264 for an elongated substantially rectangular lock bar 266 which is mounted for reciprocation therein. The lock bar 266 is of such length as to have opposed ends 266A, 266B which, when the bar 266 is in its operative position of FIGURE 5, extend beyond the opposed ends of the block 252. To serve functions to be described infra, the lock bar 266 is provided with a transversely-extending cylindrical opening 268 (see FIGURES 4 and 7) which is sheathed within the block 252 at all times during the reciprocable movement of the lock bar 266, and a tapped opening 270 (see FIGURES 4, 6 and 7) extends transversely through the bar 266 in the same direction as the opening 268 and remains exteriorly of the block 252 during the operation of the lock bar 266.

The opening 270 receives therein the threaded end 272 of a bolt 274 having a head slotted as at 276 to receive the blade (not shown) of an assembly tool, and it will be noted that as the lock bar 266 is drawn into its fully retracted position within the block 252, as shown in FIGURE 6, and is subsequently moved to its fully extended position shown in FIGURE 4, the bolt 274 will abut against the adjacent end of the block 252 to limit the movement of the lock bar 266 in the last-named direction.

The opposed faces 254A, 254B are further provided with opposed substantially parallel grooves 276A, 276B, respectively (see FIGURES 4 and 7), which extend inwardly from the front end 278 of the block 252 forming longitudinally-extending substantially rectangular stop shoulders 280A, 280B, the grooves opening at their inner ends in semicircular recesses 282A, 282B, and the latter terminate at one of their respective ends in the semicircular counterbored and tapped openings 284A, 284B. The grooves 276A, 276B continue to open into the inner end of the arcuate recesses 286A, 286B, the other ends of the latter opening into the plane of a lateral side of the block 252 as do the outer ends of the semicircular openings 284A, 284B. To serve a function to be described, the outer ends 288A, 288B terminate inwardly of the outer ends of their respective members 252A, 252B. Thus, when the members 252A, 252B are assembled to form the block 252 there arises as a consequence thereof an elongated substantially rectangular channel 290 (see FIGURE 9) in which is disposed an elongated substantially flat rectangular rock lever 292 pivotally-supported therein intermediate its ends on a pivot pin 294 which traverses the channel 290 and has its opposed ends supported on the adjacent portions of the rectangular members 252A, 252B.

As is seen in FIGURES 4 and 7, the outer end of the rock lever 290 terminates in a laterally-projecting neb 294 which is disposed forwardly of the ends 288A, 288B of the shoulders 280A, 280B, and the inner end is provided with a slot forming a spring keeper seat 296 to which further reference will be made.

The rectangular members 252A, 252B, when assembled, form a substantially hollow cylindrical spring guide 296 (see FIGURES 5 and 6) which receives the helicoidal spring 300 therein, the guide 296 opening at its outer end into the internally-threaded tapped opening 302 formed by the semicircular tapped openings 284A, 284B, the opening 302 receiving therein a tension-adjusting cap 304 which bears against one end of the spring 300. The other end of the spring 300 is received within the spring seat 296, the latter being aligned with the guide opening 298, whereby the rock arm 292 is constantly biased for pivotal movement in a counterclockwise direction, reference being made to FIGURES 4 and 7.

As is seen in the drawings, the inner end of the rock arm 292 extends transversely across the cylindrical opening 304 (see FIGURES 5 and 6) formed by the confronting arcuate recesses 286A, 286B, and the opening 304 receives therein a pin 306 which is free to reciprocate axially thereof.

The pin 306 is provided with a reduced end 308 adapted for releasable-engagement within the opening 268, as will be described below, and the other end thereof is bifurcated to provide arms 310, 312 between which is slidably and swingably-received the other end of the rock arm 292. Disengagement of the rock arm 292 from the arms 310, 312 is prevented by a cross-pin 314 which loosely secures this end of the rock arm 292 in its working position.

Countersunk screws 316 extend through the arms 240, 242 and are threaded into suitable tapped openings formed in the rectangular members 252A, 252B to mount the block 252 therebetween. The members 252A, 252B are also provided, adjacent their respective inner ends, with aligned transversely-extending openings 317A, 317B which receive therein a screw shank 318 which passes transversely through the arms 240, 242 and is secured thereon as by a nut 318'. With the block 252 mounted between the arms 240, 242, the forward end thereof projects through the opening 126, to serve a function to be described.

As is seen in FIGURES 4, 5, 6 and 7, an elongated helicoidal spring 319 under compression surrounds the lock bar 266 adjacent its inner end and abuts at one end against the bight portion 236, and at its other end against the bolt 274. The arrangement is such that the lock bolt 266 is constantly biased for outward movement, or to the right as viewed in the aforementioned figures.

Referring now more specifically to FIGURE 9, the front or outer end 278 of the block 252 which projects beyond the sidewall 114 has an ogive configuration and is provided with inwardly-spaced transversely-extending top and bottom grooves 320, 322 (see FIGURES 6 and 9) giving rise to the upper and lower shoulders 324, 326, the function of which is to be described.

The inner end of the lock bar 266 carries a transversely-extending connector pin 328 which is slidably-received within the slot 202 to form a loose connection therebetween.

In FIGURES 1 and 6 it is seen that one end of an elongated cylindrical rod 330 is pivotally-connected at 332 to the free end of the arm 160, the other end of the rod 330 being threaded at 334 to receive a tension-adjusting nut 336 thereon. The aforesaid other end of the rod 330 extends loosely through one end of a lug 338 depending from a barrel 340 supported for rotation on a shaft 342, the latter being suitably-supported between the inner and outer panels 116, 118 in the conventional manner. To the barrel 340 is connected the usual passenger door lock-operating handle 344. The rod 320 is held against disengagement with the lug 336 by means of a stop nut 346, and a helicoidal spring 348 surrounds the aforementioned other end of the rod 330 to abut at one end against the lug 338 and at its other end against the nut 336, whereby the rod 330 is constantly biased for movement to the right as viewed in FIGURE 1.

An electrical control circuit for the electromagnet 170 is provided and includes the usual push-button post 348 supported for vertical reciprocation in the conventional manner on the sill 120. An elongated lever 350 is suitably-supported on a pivot pin 352 extending between the panels 116, 118, the lever having an end 352 loosely connected at 354 to the lower end of the post 348, and the other end 356 of the lever 350 is engageable, selectively, with either of the two toggle arms 358, 360 of a conventional switch 362. A pin 364 is carried on the aforementioned one end 352 of the lever 350 and forms, with the slot 366 in which it is slidably-received, a loose connection with one end of a lever 368, the other end of the latter being pivotally-connected at 369 to one end of an arm 370 which projects from a key control lock barrel 372, all construction being old and well-known in this art.

Reference numeral 374 denotes a conventional push-button switch mounted in an exterior fixed door handle 378 and, as seen in FIGURES 1 and 3, the lead 173 connects with one side of the switch 374 to a fixed switch contact 378, the other side of the switch 374 including a fixed switch contact 380 which is connected with one end of a wire 382. The fixed contacts 378, 372 are closed, of course, by the switch arm 384 normally biased by spring 386 to its open position.

The other end of the wire 382 is connected to a fixed terminal 388 of the switch 362, the latter including a resilient switch arm 390 normally disposed in its shown open position in FIGURE 2, the switch arm 390 being moved to its closed position by means of an eccentric 392 carried on a shaft 394 to which the toggle arms 358, 360 are affixed and from which they diverge. Wire 392 connects the switch arm 390 with one side of a battery 394, the other side of the battery 394 being grounded at G1. To complete the circuit, the lead 174 is grounded as at G2.

Having described and illustrated in detail all of the component elements of this invention, the operation thereof is as follows:

With the door 18 disposed in its closed position, as shown in the several figures of the drawings, the shoulders 324, 326 being slidably-received within the undercut grooves 94, 98 and locking behind the continuous flange 100. The lock bar 266, in its operative position, projects forwardly beyond the front or forward end 278 of the block 252 and extends through the opening 62 formed in the keeper 50, and through the opening 48 formed in the door jamb sidewall 32. The bolts 274 abuts against the inner end of the block 252, and the helicoidal spring 319 is in its expanded or relaxed condition as shown in FIGURES 4 and 5. The neb 294 is disposed in confronting relation relative to the adjustment screw 104, and the reduced end 308 of the pin 306 is slidably-engaged against an adjacent side of the lock bar 266 and is forced thereagainst under the influence of the spring 300. The T-shaped crosshead 176 of the electromagnet 170 is in its extended position as shown in FIGURE 5, and the lock bolt 228 has its outermost end 230 disposed within the keeper 42. The switch arms 384, 390 are in their open positions as shown in FIGURE 3, and the electrical circuit shown therein is de-energized.

Assuming for the purpose of explanation only that a driver is occupying the seat adjacent the door 18, and that the door 18 is in its shown closed position, egress from the vehicle is obtained by manually-operating the handle 344 turning it in a clockwise direction as viewed in FIGURE 1. This causes the lug 338 to push against the nut 346 and forces the rod 330 to shift in a lateral direction (to the left as viewed in FIGURE 1). This forces the arm 160 to rotate in a counterclockwise direction as viewed in FIGURE 5, and since the arm 162 is integral therewith through the hub 164, the arm 162 will rotate in the same direction forcing the T-shaped crosshead 176 to move downwardly from its position shown in FIGURE 5 to its position shown in FIGURE 6.

Since the hub 164 is fixedly-secured to the shaft 156, the spur gear 152 is caused to turn counterclockwise, reference still being made to FIGURE 5, and in so turning, the spur gear 152 simultaneously draws the lock bolt 282 upwardly to disengage its end 230 from within the keeper 44, and to draw the lock bar 266 to the left, as viewed in FIGURE 5, causing the bolt 274 to compress the spring 319 to increase its tension and to simultaneously draw the end 266B to the left to effect its disengagement from the openings 48, 62 formed in the jamb sidewall 32 and in the keeper 50. This movement continues until the spring 319 and the lock bar 266 assume their respective positions as shown in FIGURE 6.

As the lock bar 266 is moved in the manner described, the opening 268 is brought into alignment with the reduced end 308 of the pin 306, and the force of the spring 300 then causes the reduced end 308 to lock therein, the rock lever 292 being forced to pivot in a counterclockwise direction, reference being made to FIGURE 7. The engaged shoulders 324, 326 may now be disengaged from behind the continuous flange 100 and the door may be opened by pushing thereagainst in the usual manner.

After the passenger has dismounted from the vehicle, and upon swinging the door to its normally closed position, the shoulders 324, 326 will again engage behind the flange 100 and the lock bar 266 will again align itself with the openings 62, 48 formed in the keeper 50 and the door jamb sidewall 32. As the door 18 swings to its closed position, the neb 294 will strike against the adjacent end of the adjustment screw 104 to cause the rock arm 292 to pivot about its pivot pin 294 to effect withdrawal of the reduced end 308 of the pin 306 from the opening 268, thereby freeing the rock bar 266 for movement to the right from its position shown in FIGURES 6 and 7 under the influence of the compressed spring 318. The release of the lever 266 and its movement to its locked position of FIGURES 4 and 6 causes the lever 198 to move in the same direction, thereby rotating the arms 160, 162 from their position shown in FIGURE 6 to the position shown in FIGURE 5, as originally described. Simultaneously, the lock bolt 228 which was moved with the door 18 as it assumes its closed position, becomes aligned with the keeper 44 whereby the free end 230 thereof becomes re-inserted therein as the lever 206 moves downwardly when the spur gear 152 rotates. This downward movement is assisted, of course, by the tension of the spring 232.

With the operator disposed on the outer side of the vehicle, the key control barrel 372 is operated to turn the lever 370 in a counterclockwise direction, reference being made to FIGURE 1, and this, in turn, causes the lever 368 to move downwardly and to draw simultaneously therewith the end 352 of the lever 350 downwardly in a clockwise direction to effect the closing of the switch arm 390 against the fixed switch contact 388.

To re-enter the vehicle, the operator re-inserts his key within the barrel 372 and forces the same to turn in the reverse direction, that is, clockwise, but by virtue of the lost-motion connection between the lever 350 and the lever 368, the switch arm 390 remains in its closed position.

The operator now pushes on the push button 374 of the switch 376 causing the switch arm 384 to close against the fixed switch contacts 378, 380, thereby closing the circuit to the electromagnet 170 and energizing the winding 172 thereof. This, in turn, causes the T-shaped crosshead 176 to be retracted within the winding 172, and in so moving the link 186 pulls downwardly on the arm 162, reference being made to FIGURE 5, causing the spur gear 152 to rotate in a counterclockwise direction as described above, and this, in turn, causes the levers 198 and 206 to move laterally to the left and upwardly, as before, to effect disengagement of the lock bolt 228 and lock bar 266 from their respective keepers.

As is any automotive vehicle, it may be expected that frequent use of the locking means will produce a certain amount of wear between the cooperating elements. So here, it may be anticipated that wear will be encountered as the shoulder 100 enters the grooves 320, 322 and the shoulders 324, 326 enter the grooves 94, 98. As this wear occurs, the ogive configuration of these cooperating elements effects a more snug fitting therebetween, and, of course, the adjustment screw 104 will be backed off to compensate for this wear. The rectangular lock bar keeper opening 48 and the opening 42 are of sufficient size to accommodate the lock bar 266 without misalignment thereof as wear is encountered.

It is to be understood that while but one safety locking means has been described and illustrated herein and but one electrical control circuit is shown and described therefor, similar control means can be provided for the other doors of the vehicle, whereby each door may be independently locked by means of the push button 348, in the usual manner, and all simultaneously unlocked through the actuation of the control switch 362. The circuitry therefor may comprise any of the old and well-known circuits utilized in controlling electrically-locked and unlocked vehicle doors.

Having described and illustrated one embodiment of this invention in detail, it will be understood that the same is offered merely by way of example, and that this invention is to be limited only by the scope of the appended claims.

What is claimed is:

1. A lock for motor vehicle doors comprising a side bolt and a bottom bolt; a rack connected to each bolt by a lost motion connection; each bolt having resilient means biasing it toward locking position; a gear meshing with both racks; a manually operable handle remotely connected to said gear, for rotating said gear to withdraw said bolts from locking position; solenoid means connected to said gear for rotating said gear to withdraw said bolts, a manually operable switch remote from said handle for energizing said solenoid and lost motion means in remote connection of said handle whereby said handle and said switch may be operated independently of each other.

2. A lock as set forth in claim 1, including spring-biased latch means mounted to coact with said bolts in withdrawn position for holding said bolts in such position, said latch means including a lever to disengage said latch upon closing contact with a door jamb.

3. A lock as set forth in claim 2, including the impact point between said lever and said door jamb.

References Cited

UNITED STATES PATENTS

| 1,428,367 | 9/1922 | Forlander | 292—340 X |
| 1,636,069 | 7/1927 | Perry | 292—172 |
| 1,964,066 | 6/1934 | Kuszmaul | 292—172 X |
| 1,996,865 | 4/1935 | Haag | 292—39 |
| 2,804,330 | 8/1957 | Ogley | 292—153 X |
| 2,910,317 | 10/1959 | Conlee | 292—144 X |

FOREIGN PATENTS 127,010   12/1949   Sweden.

MARVIN, A. CHAMPION, *Primary Examiner.*

J. R. MOSES, *Assistant Examiner.*